US011286329B2

(12) United States Patent
Klassen et al.

(10) Patent No.: US 11,286,329 B2
(45) Date of Patent: Mar. 29, 2022

(54) POLYOL COMPONENT AND USE THEREOF FOR THE PRODUCTION OF RIGID POLYURETHANE FOAMS

(71) Applicant: BASF SE, Ludwigshafen am Rhein (DE)

(72) Inventors: Johann Klassen, Lemfoerde (DE); Sirus Zarbakhsh, Ludwigshafen (DE); Hendrik Wagner, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/278,637

(22) PCT Filed: Sep. 24, 2019

(86) PCT No.: PCT/EP2019/075728
§ 371 (c)(1),
(2) Date: Mar. 22, 2021

(87) PCT Pub. No.: WO2020/064743
PCT Pub. Date: Apr. 2, 2020

(65) Prior Publication Data
US 2021/0309790 A1    Oct. 7, 2021

(30) Foreign Application Priority Data

Sep. 25, 2018   (EP) .................... 18196648

(51) Int. Cl.
| | |
|---|---|
| C08G 18/50 | (2006.01) |
| C08G 18/18 | (2006.01) |
| C08G 18/20 | (2006.01) |
| C08G 18/48 | (2006.01) |
| C08G 18/76 | (2006.01) |
| C08J 9/00 | (2006.01) |
| C08J 9/08 | (2006.01) |
| C08J 9/14 | (2006.01) |
| C08L 71/02 | (2006.01) |

(52) U.S. Cl.
CPC ..... *C08G 18/5027* (2013.01); *C08G 18/1808* (2013.01); *C08G 18/1816* (2013.01); *C08G 18/2036* (2013.01); *C08G 18/482* (2013.01); *C08G 18/4816* (2013.01); *C08G 18/4829* (2013.01); *C08G 18/4845* (2013.01); *C08G 18/4891* (2013.01); *C08G 18/7664* (2013.01); *C08J 9/0023* (2013.01); *C08J 9/0042* (2013.01); *C08J 9/08* (2013.01); *C08J 9/141* (2013.01); *C08L 71/02* (2013.01); *C08G 2110/005* (2021.01); *C08G 2110/0025* (2021.01); *C08J 2203/02* (2013.01); *C08J 2205/10* (2013.01); *C08J 2375/08* (2013.01); *C08L 2205/025* (2013.01); *C08L 2205/03* (2013.01)

(58) Field of Classification Search
CPC ............ C08G 18/1808; C08G 18/1816; C08G 18/2036; C08G 18/4816; C08G 18/482; C08G 18/4829; C08G 18/4845; C08G 18/4891; C08G 18/5027; C08G 18/7664; C08G 2110/0025; C08G 2110/005; C08J 9/0023; C08J 9/0042; C08J 9/08; C08J 9/141; C08J 2203/02; C08J 2205/10; C08J 2375/08; C08L 71/02; C08L 2205/025; C08L 2205/03
See application file for complete search history.

(56) References Cited

U.S. PATENT DOCUMENTS

| | | | |
|---|---|---|---|
| 10,723,831 B2 * | 7/2020 | Koch ................ | C08G 18/5033 |
| 2008/0114086 A1 * | 5/2008 | Lorenz .............. | C08G 18/4244 |
| | | | 521/88 |
| 2010/0099788 A1 * | 4/2010 | Lorenz .............. | C08G 65/2696 |
| | | | 521/172 |
| 2013/0251975 A1 * | 9/2013 | Kampf ..................... | C08J 9/141 |
| | | | 428/304.4 |
| 2018/0282469 A1 * | 10/2018 | Golini ............... | C08G 18/4887 |
| 2018/0346636 A1 * | 12/2018 | Koch ................ | C08G 18/4018 |
| 2020/0048400 A1 | 2/2020 | Zarbakhsh et al. | |

FOREIGN PATENT DOCUMENTS

| | | | |
|---|---|---|---|
| AU | 2012230372 | 7/2015 | |
| EP | 1 923 417 | 5/2008 | |
| EP | 2542612 A1 | 1/2013 | |
| WO | WO-2011/107367 A1 | 9/2011 | |
| WO | 2012/126916 | 9/2012 | |
| WO | 2014/079721 | 5/2014 | |
| WO | 2017/072152 | 5/2017 | |
| WO | WO-2017072152 A1 * | 5/2017 | ........... C08G 18/482 |
| WO | WO-2018/177941 A1 | 10/2018 | |

OTHER PUBLICATIONS

International Search Report dated Nov. 26, 2019 in PCT/EP2019/075728 with English translation, 6 pages.
Written Opinion dated Nov. 26, 2019 in PCT/EP2019/075728 with English translation, 10 pages.
European Search Report for EP Patent Application No. 18196648.2, dated Mar. 13, 2019, 3 pages.
Mihail Ionescu, "Chapter 3—The General Characteristics of Oligo-Polyols", Chemistry and Technology of Polyols for Polyurethanes, Rapid Technology Limited, 2005, pp. 34-39.

* cited by examiner

*Primary Examiner* — John M Cooney
(74) *Attorney, Agent, or Firm* — Grüneberg and Myers PLLC

(57) ABSTRACT

A polyol component P) contains at least three different polyether polyols A) to C), and at least one polyether ester polyol D). A process for producing rigid polyurethane foams using the polyol component P) and the rigid polyurethane foams produced therefrom can be utilized.

19 Claims, No Drawings

POLYOL COMPONENT AND USE THEREOF FOR THE PRODUCTION OF RIGID POLYURETHANE FOAMS

CROSS-REFERENCE TO RELATED APPLICATIONS

This application is the National Stage entry under § 371 of International Application No. PCT/EP2019/075728, filed on Sep. 24, 2019, and which claims the benefit of European Application No. 18196648.2, filed on Sep. 25, 2018. The content of each of these applications is hereby incorporated by reference in its entirety.

BACKGROUND OF THE INVENTION

Field of the Invention

The invention relates to a polyol component P), to a process for producing rigid polyurethane foams using the polyol component P) and to rigid polyurethane foams produced with the polyol component P).

Description of Related Art

Rigid polyurethane (PU) foams can be produced in a known manner by reacting organic polyisocyanates with one or more compounds containing at least two reactive hydrogen atoms, preferably polyether, polyester and/or polyether ester alcohols (polyols), in the presence of blowing agents, catalysts and optionally auxiliaries and/or additives.

Rigid PU foams are often used for the production of refrigeration appliances. Here, the housings of the refrigeration appliances are typically foam-filled with the polyol/isocyanate mixture and the rigid PU foam forms in situ between the two covers that respectively form the inner and outer casing of the refrigerator. In order to ensure the stability of the composite structure thus produced, the rigid PU foams must form a sufficiently firm connection with the outer casing and the inner casing, that is, the rigid PU foams must exhibit good adhesion. For a high throughput in the step of foam-filling, and thus high productivity, good demolding performance of the rigid PU foam is crucial. This can be discerned, for example, from the fact that the freshly cured rigid PU foam exhibits an extremely low post-expansion. Furthermore, the rigid PU foam must of course display the best possible thermal insulation. Good insulation properties are displayed, for example, by rigid PU foams which are produced using physical blowing agents such as hydrocarbons, for example $C_5$ hydrocarbons, especially cyclopentane. However, this requires the polyol components used for the production of the rigid PU foam to have a good compatibility with hydrocarbons. In particular, this combined property profile is still not sufficiently ensured by the prior-art polyol components.

Typically used for the production of isocyanate-based rigid PU foams are polyols having high functionalities and low molecular weight, in order to ensure an optimum crosslinking of the foams. The polyether polyols preferably used have in most cases a functionality of from 4 to 8 and a hydroxyl number in the range from 300 to 600, especially from 400 to 500 mg KOH/g. It is known that polyols having very high functionality and hydroxyl numbers in the range from 300 to 600 mg KOH/g have very high viscosity. It is also known that polyols of this type are comparatively polar and thus have a poor dissolution capacity for typical blowing agents, especially hydrocarbons such as pentanes, especially cyclopentane. In order to alleviate this deficiency, the polyol component is often admixed with polyether alcohols having functionalities of 2 to 4 and hydroxyl numbers of 100 to 250 mg KOH/g.

WO 2018/177941 A1 describes a polyol component for the production of rigid PU foam comprising a polyether polyol having high functionality and a hydroxyl number of 300 to 500 mg KOH/g, a polyether polyol having a functionality of 3 to 5 and a hydroxyl number of 100 to 290 mg KOH/g and a polyether polyol having a functionality of 3 to 5 and a hydroxyl number of 300 to 500 mg KOH/g.

WO 2017/072152 A1 discloses a polyol component for the production of rigid PU foam which comprises a polyether polyol having high functionality and a hydroxyl number of 400 to 520 mg KOH/g, a polyether polyol having a functionality of 3.7 to 4 and a hydroxyl number of 300 to 420 mg KOH/g, and a polyether ester polyol (polyether ester polyols) having a fatty acid content of 8% to 17% by weight.

SUMMARY OF THE INVENTION

It is an object of the present invention to provide a polyol component that, compared to the polyol components known in the prior art, leads to further improvements in the rigid PU foams produced therefrom; in particular the intention is for rigid PU foams to be producible that have better demolding times combined with good adhesion properties and good thermal insulation properties. Moreover, the intention is for the polyol components to have good compatibility with hydrocarbons.

This object is achieved by a polyol component P) comprising:
a) 35% to 70% by weight of one or more polyether polyols A) having an OH number in the range from 300 to 520 mg KOH/g and selected from reaction products of monosaccharides, oligosaccharides, polysaccharides, polyhydric alcohols, alkoxylation products of the aforementioned compounds or mixtures thereof with alkylene oxides;
b) 5% to 45% by weight of one or more polyether polyols B) having an OH number in the range from 320 to 500 mg KOH/g and selected from reaction products of aromatic diamines with alkylene oxides;
c) >0% to 30% by weight of one or more polyether polyols C) having an OH number in the range from 100 to 240 mg KOH/g and selected from reaction products of amines, polyhydric alcohols or mixtures thereof with alkylene oxides;
d) 5% to 40% by weight of one or more polyether ester polyols D) having an OH number of 380 to 480 mg KOH/g and a content of fatty acid of 5% to 25% by weight, based on the polyether ester polyols D);
e) optionally one or more catalysts E);
f) optionally one or more further components F) selected from auxiliaries and additives,
g) optionally one or more blowing agents selected from chemical blowing agents G1) and physical blowing agents G2);
where the concentration figures in % by weight for A) to D) are based on the total amount of components A) to G1) of the polyol component P).

The object is additionally achieved by a process for producing rigid polyurethane foams by reacting
I) di- or polyisocyanates PI) or mixtures thereof with
II) a polyol component P).

The object is likewise achieved by a rigid polyurethane foam that is obtainable by the process according to the invention and also by the use of the polyol component P) according to the invention for the production of rigid polyurethane foams.

The object is likewise achieved by the use of the polyurethane foam produced by the process according to the invention for insulation and refrigeration applications.

Rigid PU foams produced with the polyol component P) according to the invention have very good demolding times and simultaneously good adhesion properties and good thermal insulation.

The invention is described in more detail below.

DETAILED DESCRIPTION OF THE INVENTION

The OH number (hydroxyl number) can be determined by means of well-established methods. By way of example, the OH number can be determined according to DIN 53240 (1971-12).

The functionality of a polyol, especal of the polyether polyols A), B) and C) to be used according to the invention and also of the polyether ester polyol D), within the context of the present invention means the number of alkylene oxide-reactive hydrogen atoms per mole of starter compound or per mole of mixture of the starter compounds prior to the time of alkylene oxide metering. The time of the alkylene oxide metering is in this case the start of the addition of the alkylene oxide component to the starter compound(s). The calculation takes into account all alkylene oxide-reactive hydrogen atoms of the starter compound(s) that are present in the starter mixture.

The functionality F in the context of the present invention is calculated according to the following formula (I):

$$F = \frac{\sum_{i=1}^{m} n_i \cdot f_i}{\sum_{i=1}^{m} n_i} \quad (I)$$

$n_i$=moles of starter i
$f_i$=functionality of starter i
m=number of starters in the starter mixture
F=functionality The functionality F of a polyol produced from a mixture of two starter compounds (m=2) is calculated as follows:

F=(moles of starter compound A*functionality of starter compound A+moles of starter compound B*functionality of starter compound B)/(moles of starter A+moles of starter B).

The formula can be amended accordingly for other starter molecules. Thus, for example, a polyether polyol has a functionality of 5.12 when 626.48 mol of glycerol (functionality 3), 559.74 mol of sucrose (functionality 8) and 67.31 mol of dimethylethanolamine (functionality 1) are used.

The functionality F determined by the formula presented above is also called equivalent functionality and is known to those skilled in the art as a readily accessible method or determining the functionality of polyols, see M. Ionescu "Chemistry and Technology of Polyols for Polyurethanes", 2005, Rapra Technology Limited, pages 34 to 39.

The functionality of the polyether polyols A), B) and C) and of the polyether ester polyol D), as defined above according to the invention, can differ from the functionality after commencement of the addition of at least one alkylene oxide, that is, during the reaction of the at least one alkylene oxide with a starter compound, or of the reaction product, since during the reaction there is formation of by-products such as glycols and unsaturated monofunctional constituents. The side-reactions are known in the literature. The functionality of the polyether polyols A), B) and C) and of the polyether ester polyol D) can thus also be referred to as the functionality of the starter or starter mixture used for the preparation of the respective polyol.

According to the definition of functionality given above, "polyether polyol having a functionality in the range from 4.6 to 6.5 and selected from reaction products of monosaccharides, oligosaccharides, polysaccharides, polyhydric alcohols, alkoxylation products of the aforementioned compounds or mixtures thereof with alkylene oxides" means, for example, that the monosaccharides, oligosaccharides, polysaccharides, polyhydric alcohols, alkoxylation products of the aforementioned compounds or mixtures thereof used for the reaction with the alkylene oxides have an equivalent functionality of 4.6 to 6.5 according to formula (I).

A polyether polyol in the context of the present invention is an organic compound that contains at least ether and OH groups as functional groups. The polyether polyol typically has 2 to 20 OH groups, preferably 2 to 10 OH groups, particularly preferably 2 to 8 OH groups.

A polyether ester polyol in the context of the invention is an organic compound that contains at least ether, ester and OH groups as functional groups. The polyester ether polyol typically has 2 to 20 OH groups, preferably 2 to 10 OH groups, particularly preferably 2 to 8 OH groups.

In the context of the present invention, the limits of the ranges stated are preferably included. Thus, for example, the values 5.2 and 6.4 are comprised within the range from 5.2 to 6.4.

The particular polyether polyols A), B), C) and polyether ester polyol D) are different from one another according to the present invention.

The polyether polyols A), B) and C) and the polyether ester polyols D) are selected from reaction products of different starters with alkylene oxides. Suitable alkylene oxides are selected, for example, from $C_2$-$C_4$ alkylene oxides. These comprise ethylene oxide, propylene oxide, 1,2- and 2,3-butylene oxide and mixtures thereof. Particular preference is given to propylene oxide, ethylene oxide and mixtures thereof. The alkylene oxides may be used individually, in alternating succession, or in the form of mixtures.

Polyether Polyol A)

The polyol component P) comprises one or more polyether polyols A) having an OH number in the range from 300 to 520 mg KOH/g, preferably in the range from 390 to 520 mg KOH/g.

The polyether polyols A) are selected from reaction products of monosaccharides, oligosaccharides, polysaccharides, polyhydric alcohols, alkoxylation products of the aforementioned compounds or mixtures thereof with alkylene oxides. The monosaccharides, oligosaccharides, polysaccharides, polyhydric alcohols that are employed according to the invention and the alkoxylation products of the aforementioned compounds comprise at least two alkylene oxide-reactive OH groups and are also referred to within the scope of the present invention as starter compound $S^{A)}$ or starter $S^{A)}$. The starter compound comprises the terms starter compound and starter compounds. In the reaction with the alkylene oxides, the alkylene oxides are added to the starter compound(s), this generally taking place with use of a catalyst. This reaction is known per se to those skilled in the art.

The polyhydric alcohols used as starter compounds $S^{A)}$ for the polyether polyols A) are preferably organic compounds having 2 to 20 OH groups, preferably 2 to 10 OH groups and particularly preferably having 3 to 8 OH groups. They are preferably selected from monomers, dimers and trimers. The molecular weight is preferably up to 400 g/mol, preferably up to 300 g/mol and particularly preferably up to 200 g/mol. Examples of the polyhydric alcohols used as starter compounds are sugar alcohols such as sorbitol and mannitol, t e monomeric polyhydric alcohols ethylene glycol, propylene glycol, glycerol, trimethylolpropane and pentaerythritol, the dimeric polyhydric alcohols diethylene glycol and dipropylene glycol and also the trimeric polyhydric alcohol triethylene glycol.

Examples of monosaccharides, oligosaccharides and polysaccharides employed according to the invention are glucose and sucrose.

Furthermore, alkoxylation products of the listed monosaccharides, oligosaccharides, polysaccharides, polyhydric alcohols or mixtures thereof can be employed as starter compounds $S^{A)}$. The term "mixtures thereof" in this context means mixtures of at least two different starter compounds selected from the monosaccharides, oligosaccharides, polysaccharides and polyhydric alcohols mentioned. Examples of such mixtures are mixtures of two different polyhydric alcohols such as glycerol and sorbitol and mixtures of a polyhydric alcohol and a monosaccharide such as glycerol and sucrose, and mixtures of glycerol, ethylene glycol and sucrose.

The monosaccharides, oligosaccharides, polysaccharides, polyhydric alcohols or mixtures thereof are reacted as described above with alkylene oxides to form the alkoxylation products; the alkoxylation products are usually prepared using $C_2$-$C_4$ alkylene oxides, preferably using ethylene oxide and/or propylene oxide. The alkoxylation products are then once again reacted, as starter compound $S^{A)}$, with alkylene oxides in the preparation of the polyether polyols A). The use of the alkoxylation products as starter compounds $S^{A)}$ is especially advantageous when further starter compounds $S^{A)}$ which are initially present as a solid or have a high viscosity are employed, as is described further below.

Preference is given to using sorbitol, mannitol, glycerol, trimethylolpropane, pentaerythritol, sucrose and mixtures thereof as starter compounds $S^{A)}$ and also mixtures of one or more compounds selected from sorbitol, mannitol, glycerol, trimethylolpropane, pentaerythritol and sucrose and one or more further polyhydric alcohols selected from ethylene glycol, propylene glycol, diethylene glycol, dipropylene glycol and triethylene glycol. In the context of the present invention, dipropylene glycol comprises 2,2'-oxydi-1-propanol, 1,1'-oxydi-2-propanol and 2-(2-hydroxypropoxy)-1-propanol.

The starter compounds for the polyether polyols A) are preferably selected such that the functionality of the component $S^{A)}$ is 4.6 to 6.5, more preferably 4.8 to 6.5, particularly preferably 5.2 to 6.5 and very particularly preferably 5.7 to 6.5.

Particularly preferred as starter compounds $S^{A)}$ are mixtures of sucrose and at least one compound selected from glycerol, diethylene glycol and dipropylene glycol. Very particular preference is given to a mixture of sucrose and glycerol.

The polyether polyols A) are preferably selected from the reaction products of
10% to 60% by weight of at least one starter compound $S^{A)}$ and
40% to 90% by weight of at least one alkylene oxide, based on the total weight of the polyether polyol A) plus any catalyst used.

The proportion of the starter compounds $S^{A)}$ in the polyether polyols A) employed according to the invention is preferably 20% to 45% by weight, more preferably 25% to 42% by weight, particularly preferably 30% to 40% by weight, very particularly preferably 33% to 38% by weight, based on the weight of the polyether polyol A).

The polyether polyols A) are particularly preferably selected from the reaction products of
ai) 5% to 55% by weight of at least one starter compound $S^{A)}$ selected from glucose, mannitol, sucrose, pentaerythritol, trimethylolpropane and sorbitol.
aii) 5% to 55% by weight of at least one starter compound $S^{A)}$ that is different from ai), preferably selected from glycerol, monopropylene glycol, diethylene glycol, triethylene glycol, dipropylene glycol, alkoxylation products of the aforementioned compounds and alkoxylation products of glucose, mannitol, sucrose, pentaerythritol, trimethylolpropane and/or sorbitol or mixtures thereof,
aiii) 40% to 90% by weight of at least one alkylene oxide, preferably selected from propylene oxide and ethylene oxide,
where the sum total of ai), aii) and/or aiii) is 100% by weight, plus any catalyst used such as imidazole.

The catalyst is optionally employed in addition to the components ai), aii), aiii).

Basic compounds are employed in most cases as catalysts for the reaction of the starter compound(s) $S^{A)}$ with alkylene oxide(s). In industrial processes, these are mostly hydroxides of alkali metals, such as for example sodium, cesium or in particular potassium hydroxide. Alkali metal alkoxides, such as for example sodium methoxide, sodium or potassium methoxide or potassium isopropoxide, are known as catalysts. Preparation can also be effected with amine catalysis.

The amine catalysts are preferably selected from the group comprising trialkylamines, such as for example trimethylamine, triethylamine, tripropylamine and tributylamine; dimethylalkylamines, such as for example dimethylethanolamine, dimethylcyclohexylamine, dimethylethylamine and dimethylbutylamine; aromatic amines, such as for example dimethylaniline, dimethylaminopyridine, dimethylbenzylamine, pyridine, imidazoles, such as for example imidazole, 4(5)-methylimidazole, 3-methylimidazole and 1-hydroxypropylimidazole; guanidines and amidines, such as for example 1,5-diazabicyclo[4.3.0]non-5-ene and 1,5-diazabicyclo[5.4.0]undec-7-ene. The catalyst is preferably dimethylethanolamine. The catalyst is very particularly preferably an imidazole.

The adduct formation with the alkylene oxides is preferably conducted at a temperature between 90 and 150° C. and a pressure between 0.1 to 8 bar. The metering of the alkylene oxides is typically followed by a post-reaction phase, in which the alkylene oxide is depleted by reaction. If necessary, a post-reaction phase can follow thereafter. Distillation typically follows to separate off volatile constituents, preferably under reduced pressure.

Especially when using solid starter compounds, such as for example sucrose, for the preparation of the polyether polyol A) according to the invention, only slow metering rates are possible at the start of the process, since the alkylene oxide dissolves only poorly in the reaction mixture and leads to slow reaction rates. Moreover, the high viscosity arising when using solid starter compounds in the starter mixture ensures relatively poor dissipation of heat. This can lead to local instances of overheating, which has a negative impact on the product quality. Moreover, the high viscosity hastens wear and tear of pumps and heat exchangers. By adding at least one further polyol to the starter mixture, the negative effects can be reduced. This is described, for example, in EP 2542612. In some of the experiments described, the mixtures of the starter compounds were therefore admixed with polyetherols in order to reduce the viscosity of the starting mixture and enable a better process regime.

Alkoxylation products of monosaccharides, oligosaccharides, polysaccharides, polyhydric alcohols or mixtures thereof are preferably added during the preparation of the polyetherols A) for the reduction of viscosity. Particular preference is given to a sucrose/glycerol-started propoxylate having a molar mass of 488 g/mol, an OH number of 490 mg/mol and a functionality of 4.3 and also a sucrose/glycerol-started propoxylate having a molar weight of 639 g/mol and a functionality of 5.1. The use of the alkoxylation products as further starter compound $S^{A)}$ primarily serves to simplify the process regime.

When calculating the functionality of the polyether polyol A) according to the invention, the above-mentioned alkoxylation products are correspondingly taken into account.

The polyether polyols A) preferably have functionalities in the range from 4.6 to 6.5, more preferably from 4.8 to 6.5, particularly preferably from 5.2 to 6.5 and very particularly preferably from 5.7 to 6.5. The use of polyether polyols A) having higher functionalities leads to improved demolding during the production of the rigid PU foams.

By means of the use of polyether polyols A) having high functionalities, it is possible, combined with polyether ester polyol D), to improve demolding in the case of rigid polyurethane foams.

In a further preferred configuration, the polyether polyol A) has a functionality in the range from 4.8 to 6.5 and an OH number in the range from 300 to 520 mg KOH/g, in particular a functionality in the range from 5.2 to 6.5 and an OH number in the range from 390 to 520 mg KOH/g.

In general, the proportion of the polyether polyols A) is 35% to 70% by weight, preferably 37% to 65% by weight, particularly preferably 40% to 60% by weight, based on the total amount of components A) to G1) of the polyol component P).

Polyether Polyols B)

The polyol component P) comprises one or more polyether polyols B) having an OH number in the range from 320 to 500 mg KOH/g, preferably in the range from 380 to 450 mg KOH/g.

The polyether polyol B) preferably has a functionality in the range from 3.0 to 4.0, more preferably a functionality in the range from 3.5 to 4.0, particularly preferably a functionality in the range from 3.8 to 4.0.

The polyether polyols B) are selected from the reaction products of aromatic diamines with alkylene oxides. The aromatic diamines are also referred to as starter compound or starter compounds $S^{B)}$.

Examples of the aromatic diamines employed as starter compounds $S^{B)}$ are tolylenediamines (TDA) and methylenedianilines (MDA). Preferred starter compounds $S^{B)}$ are tolylenediamines (TDA). Tolylenediamines comprise tolylene-2,3-, -3,4-, -2,4-, -2,5- and -2,6-diamine. Tolylene-2,3- and -3,4-diamine are also referred to as vicinal TDA.

The tolylenediamine isomers can be employed individually or in mixtures, for example as mixtures of 2,4-TDA and 2,6-TDA, as mixtures of 3,4-TDA and 2,3-TDA, or as mixtures of 2,4-TDA, 2,6-TDA, 3,4-TDA and 2,3-TDA. Particular preference is given to employing mixtures of tolylenediamines having a content of at least 75% by weight, preferably at least 80% by weight, particularly preferably at least 85% by weight and especially of at least 90% by weight, of vicinal tolylenediamine, based in each case on the total weight of the mixtures.

The aromatic diamines employed as starter compounds $S^{B)}$ for the polyether polyols B) used according to the invention are preferably selected such that the functionality thereof is 3.0 to 4.0, more preferably 3.5 to 4.0 and particularly preferably 3.8 to 4.0. A mixture of suitable starter molecules is optionally employed.

The polyether polyols B) are preferably selected from the reaction products of tolylene-2,3-, -3,4-, -2,4-, -2,5-, -2,6-diamine or mixtures thereof with $C_2$-$C_4$ alkylene oxides, particular preference being given to polyether polyols B) selected from the reaction products of mixtures of tolylenediamines comprising at least 75% by weight, more preferably at least 80% by weight, particularly preferably at least 85% by weight and especially at least 90% by weight, of vicinal TDA, based on the tolylenediamine mixture, with $C_2$-$C_3$ alkylene oxides.

In general, the proportion of the polyether polyols B) is 5% to 45% by weight, preferably 8% to 40% by weight, particularly preferably 10% to 38% by weight, based on the total amount of components A) to G1) of the polyol component P).

Polyether Polyols C)

The polyol component P) comprises one or more polyether polyols C) having an OH number in the range from 100 to 240 mg KOH/g, preferably from 120 to 220 mg KOH/g, particularly preferably from 140 to 200 mg KOH/g.

The polyether polyol C) preferably has a functionality in the range from 2.8 to 5.0, preferably a functionality in the range from 3.1 to 5.0, more preferably from 3.5 to 4.5 and particularly preferably a functionality of 3.5 to 4.0.

According to one embodiment of the invention, the functionality is in the range from 3.0 to 5.0, or 3.1 to 5.0.

According to a further embodiment of the invention, the functionality is therefore in the range from 2.8 to 3.0, or 2.8 to below 3.0.

Polyether polyol C) is selected from reaction products of amines, polyhydric alcohols or mixtures thereof with alkylene oxides.

The amines, polyhydric alcohols and mixtures thereof employed as starter compounds $S^{C)}$ for the polyether polyols C) used according to the invention are generally selected such that the functionality thereof is 2.8 to 5.0, preferably 3.1 to 5.0, more preferably 3.5 to 4.5 and particularly preferably 3.5 to 4.0. A mixture of suitable starter molecules is optionally employed.

Useful starter compounds $S^{C)}$ for the polyether polyols C) include, for example: aliphatic and aromatic diamines such as ethylenediamine, propylene-1,3-diamine, butylene-1,3- or -1,4-diamine, hexamethylene-1,2-, -1,3-, -1,4-, -1,5- and -1,6-diamine, phenylenediamine, tolylene-2,3-, -3,4-, -2,4-, -2,5- and -2,6-diamine and 4,4'-, 2,4'- and 2,2'-diaminodiphenylmethane.

Particular preference is given to the aforementioned primary diamines, especially mixtures of the aforementioned primary amines comprising vicinal TDA (vic-TDA).

Useful starter compounds $S^{C)}$ for polyether polyol C) also include polyhydric alcohols as described above for polyether polyol A). The polyhydric alcohols are preferably selected from the group consisting of glycerol, trimethylolpropane, monopropylene glycol, diethylene glycol, triethylene glycol, dipropylene glycol and mixtures thereof. Very particular preference is given to glycerol.

According to one embodiment, the polyether polyol C) comprises one or more reaction products of amines selected from ethylenediamine, propylene-1,3-diamine, butylene-1, 3-, -1,4-diamine, hexamethylene-1,2-, -1,3-, -1,4-, -1,5-, -1,6-diamine, phenylenediamine, tolylene-2,3-, -3,4-, -2,4-, -2,5-, -2,6-diamine and 4,4'-, 2,4'-, 2,2'-diaminodiphenyl-methane and mixtures thereof with alkylene oxides; the polyether polyol C) is preferably selected from the aforementioned reaction products.

According to a further embodiment, the polyether polyol C) comprises one or more reaction products of polyhydric alcohols selected from glycerol, trimethylolpropane, monopropylene glycol, diethylene glycol, triethylene glycol and mixtures thereof with alkylene oxides; the polyether polyol C) is preferably selected from the aforementioned reaction products.

The alkylene oxides employed for the preparation of the polyetherols C) correspond to the alkylene oxides described further above. The polyether polyols C) preferably comprise ethylene oxide and propylene oxide units, the polyetherols C) are more preferably selected from reaction products of amines, polyhydric alcohols or mixtures thereof with ethylene oxide and propylene oxide and the polyetherols C) are especially preferably selected from the reaction products of ethylenediamine, propylene-1,3-diamine, butylene-1,3-, -1,4-diamine, hexamethylene-1,2-, -1,3-, -1,4-, -1,5-, -1,6-diamine, phenylenediamine, tolylene-2,3-, -3,4-, -2,4-, -2,5-, -2,6-diamine and 4,4'-, 2,4'-, 2,2'-diaminodiphenylmethane, glycerol, trimethylolpropane, monopropylene glycol, diethylene glycol, triethylene glycol, dipropylene glycol or mixtures thereof with ethylene oxide and propylene oxide.

Polyether polyols B) and C) used according to the invention can be prepared by known processes, for example by anionic polymerization using alkali metal hydroxides, such as, for example, sodium or potassium hydroxide, or alkali metal alkoxides, such as, for example, sodium methoxide, sodium or potassium methoxide or potassium isopropoxide, as catalysts or by cationic polymerization using Lewis acids, such as antimony pentachloride, boron fluoride etherate, inter alia, or fuller's earth, as catalysts, from one or more alkylene oxides having 2 to 4 carbon atoms in the alkylene radical. Preparation can likewise be effected using imidazole catalysis or using trimethylamine or N,N-dimethylcyclohexylamine.

In general, the proportion of the polyether polyols C) in the polyol component P) is >0% to 30% by weight, preferably 1% to 25% by weight, particularly preferably 2% to 20% by weight, based on the total amount of components A) to G1) of the polyol component P).

Polyether Ester Polyols D)

The polyol component P) comprises one or more polyether ester polyols D) having an OH number of 380 to 480 mg KOH/g, preferably of 390 to 440 mg KOH/g, especially preferably 410 to 430 mg KOH/g.

In addition, the content of fatty acid in the polyether ester polyols D) is 5% to 25% by weight, preferably 10% to 20% by weight, particularly preferably 10% to 15% by weight, based on the total weight of the polyether ester polyols D).

The polyether ester polyol D) preferably has a functionality in the range from 3.0 to 5.0, preferably a functionality in the range from 3.2 to 5.0, more preferably from 3.4 to 4.8, more preferably still 4.0 to 4.7 and especially preferably from 4.2 to 4.6.

Suitable polyether ester polyols D) are selected from reaction products of one or more hydroxyl group-containing starter compounds, one or more fatty acids, fatty acid monoesters or mixtures thereof and one or more $C_2$-$C_4$ alkylene oxides. The hydroxyl group-containing starter compounds are preferably selected from monosaccharides, oligosaccharides, polysaccharides, polyhydric alcohols or mixtures thereof.

Preferred hydroxyl group-containing starter compounds are selected from the group consisting of: sugars and sugar alcohols such as glucose, mannitol, sucrose and sorbitol, polyhydric phenols, resoles, such as for example oligomeric condensation products of phenol and formaldehyde, polyhydric alcohols such as trimethylolpropane, pentaerythritol, glycerol and glycols such as ethylene glycol, propylene glycol and condensation products thereof such as polyethylene glycols and polypropylene glycols, for example diethylene glycol, triethylene glycol, dipropylene glycol, and water.

Particularly preferred starter compounds are sugars and sugar alcohols such as sucrose and sorbitol, glycerol, and mixtures of the aforementioned sugars and/or sugar alcohols with glycerol, water and/or glycols, such as for example diethylene glycol and/or dipropylene glycol. Very particular preference is given to mixtures of sucrose and at least one—preferably one—compound selected from: glycerol, diethylene glycol and dipropylene glycol. Very particular preference is given to a mixture of sucrose and glycerol.

In general, the fatty acid or the fatty acid monoester is selected from the group consisting of polyhydroxy fatty acids, ricinoleic acid, hydroxyl-modified oils, hydroxyl-modified fatty acids and fatty acid esters based on myristoleic acid, palmitoleic acid, oleic acid, stearic acid, palmitic acid, vaccenic acid, petroselenic acid, gadoleic acid, erucic acid, nervonic acid, linoleic acid, α- and γ-linolenic acid, stearidonic acid, arachidonic acid, timnodonic acid, clupanodonic acid and cervonic acid. Preferred fatty acid monoesters are the fatty acid methyl esters. Preferred fatty acids are stearic acid, palmitic acid, linolenic acid and especially oleic acid, monoesters thereof, preferably methyl esters thereof, and mixtures thereof. The fatty acids can be used as pure fatty acids or fatty acid esters. They are preferably used as fatty acid esters. Very particular preference is given to using fatty acid methyl esters, such as for example biodiesel or methyl oleate.

"Biodiesel" is to be understood to mean fatty acid methyl esters based on the standard EN 14214 from 2010. The main constituents of biodiesel, generally obtained from rapeseed oil, soya oil or palm oil, are methyl esters of saturated $C_{16}$ to $C_{18}$ fatty acids and methyl esters of mono- or polyunsaturated $C_{18}$ fatty acids, such as oleic acid, linoleic acid and linolenic acid.

Suitable alkylene oxides having 2 to 4 carbon atoms are, for example, ethylene oxide, tetrahydrofuran, propylene oxide, 1,2- or 2,3-butene oxide. The alkylene oxides may be used individually, in alternating succession, or in the form of mixtures. Preferred alkylene oxides are propylene oxide and ethylene oxide, particular preference is given to mixtures of ethylene oxide and propylene oxide having >50% by weight of propylene oxide and very particular preference is given to pure propylene oxide.

In one preferred embodiment, the alkoxylation catalyst used is an amine, preferably dimethylethanolamine or imidazole; particular preference is given to imidazole.

Suitable polyether ester polyols D) are selected from reaction products of
di) 20% to 35% by weight of one or more hydroxyl group-containing starter compounds;
dii) 5% to 25% by weight, preferably 10% to 20% by weight, particularly preferably 10% to 15% by weight of one or more fatty acids, fatty acid monoesters or mixtures thereof,
diii) 50% to 65% by weight of one or more alkylene oxides having 2 to 4 carbon atoms, based on the total weight of the polyether ester polyols D).

The proportion of starter compounds di) in the polyether ester polyols D) employed according to the invention is generally 20% to 35% by weight, preferably 22% to 32% by weight, particularly preferably 24% to 30% by weight, very particularly preferably 24% to 29% by weight, based on the total weight of the polyether ester polyols D).

The proportion of fatty acid or of the fatty acid monoesters dii) in the polyether ester polyols D) employed according to the invention is generally preferably 10% to 20% by weight, particularly preferably 10% to 15% by weight, based on the weight of the polyether ester polyols D).

The proportion of alkylene oxides diii) in the polyether ester polyols D) employed according to the invention is generally 50% to 65% by weight preferably 52% to 62% by weight, particularly preferably 55% to 61% by weight, very particularly preferably 57% to 60% by weight, based on the weight of the polyether ester polyols D).

In general, the proportion of the polyether ester polyols D) is 5% to 40% by weight, preferably 7% to 35% by weight, more preferably 9% to 35% by weight, particularly preferably 11% to 32% by weight, based on the sum total of components A) to G1) of the polyol component P).

Catalysts E)

The polyol component P) according to the invention can comprise at least one catalyst E).

Catalysts E) used are especially compounds that greatly quicken the reaction of the polyether polyols A), B) and C) and polyether ester polyols D) present in the polyol component P) with the organic, optionally modified di- and/or polyisocyanates PI as per the process according to the invention below.

Basic polyurethane catalysts can be expediently used as catalysts E), for example tertiary amines such as triethylamine, tributylamine, dimethylbenzylamine, dicyclohexylmethylamine, dimethylcyclohexylamine, bis(2-dimethylaminoethyl) ether, bis(dimethylaminopropyl)urea, N-methyl- or N-ethylmorpholine, N-cyclohexylmorpholine, N,N,N',N'-tetramethylethylenediamine, N,N,N,N-tetramethylbutanediamine, N,N,N,N-tetramethylhexane-1,6-diamine, pentamethyldiethylenetriamine, dimethylpiperazine, N-dimethylaminoethylpiperdine, 1,2-dimethylimidazole, 1-azabicyclo[2.2.0]octane, 1,4-diazabicyclo[2.2.2]octane (Dabco), 1,8-diazabicyclo[5.4.0]undec-7-ene, and alkanolamine compounds such as triethanolamine, triisopropanolamine, N-methyl- and N-ethyldiethanolamine, dimethylaminoethanol, 2-(N,N-dimethylaminoethoxy)ethanol, N,N',N''-tris(dialkylaminoalkyl)hexahydrotriazines, for example N,N',N''-tris(dimethylaminopropyl)-s-hexahydrotriazine, and triethylenediamine. Also suitable, however, are metal salts, such as iron(II) chloride, zinc chloride, lead octoate and preferably tin salts, such as tin dioctoate, tin diethylhexanoate and dibutyltin dilaurate.

Useful catalysts E) also include: amidines, such as 2,3-dimethyl-3,4,5,6-tetrahydropyrimidine, tetraalkylammonium hydroxides, such as tetramethylammonium hydroxide, alkali metal hydroxides, such as sodium hydroxide, and alkali metal alkoxides, such as sodium methoxide and potassium isopropoxide, and also alkali metal salts of acids, especially long-chain fatty acids having 10 to 20 carbon atoms and optionally lateral OH-groups.

Preference is given to using a mixture of a plurality of the aforementioned catalysts E). Particular preference is given to using a catalyst mixture E) consisting of: dimethylcyclohexylamine E1), pentamethyldiethylenetriamine or bis(2-dimethylaminoethyl) ether E2), tris(dimethylaminopropyl)hexahydro-1,3,5-triazine E3) and dimethylbenzylamine E4).

Preferably, in the aforementioned catalyst mixture consisting of the catalysts E1) to E4), the proportion of the catalyst E1) is 20% to 60% by weight, the proportion of the catalyst E2) is 10% to 50% by weight, the proportion of the catalyst E3) is 10% to 40% by weight and the proportion of the catalyst E4) is 20% to 50% by weight, wherein the sum total of the catalysts E1) to E4) is 100% by weight.

Use is preferably made of 1.0% to 5.5% by weight, especially 1.0% to 5.0% by weight, of one or more catalysts E), based on the weight of the polyol component P).

If a relatively large polyisocyanate excess is used in the foaming, useful catalysts for the trimerization reaction of the excess NCO groups with one another also include: isocyanurate group-forming catalysts, for example ammonium ion salts or alkali metal salts, alone or in combination with tertiary amines. The formation of isocyanurate leads to flame-retardant PIR foams which are preferably employed in industrial rigid foam, for example in the construction industry as insulation panels or sandwich elements.

Further details regarding the catalysts mentioned can be found in the technical literature, for example in Kunststoffhandbuch [Plastics Handbook], Volume VII, Polyurethane [Polyurethanes], Carl Hanser Verlag Munich, Vienna, 1st, 2nd and 3rd Editions, 1966, 1983 and 1993.

Component F)

The polyol component P) according to the invention can comprise one or more further components F) selected from auxiliaries and additives.

Auxiliaries and additives F) of the polyol component P) are for example surface-active substances such as emulsifiers, foam stabilizers and cell regulators.

Useful surface-active substances include, for example, compounds which serve to aid homogenization of the starting materials and which may also be suitable for regulating the cell structure of the plastics. Mention can be made, for example, of emulsifiers, such as sodium salts of castor oil sulfates or of fatty acids and salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers, such as siloxane-oxyalkylene copolymers and other organopolysiloxanes, ethoxylated alkylphenols, ethoxylated fatty alcohols, paraffin oils, castor oil esters or ricinoleic esters, turkey red oil and peanut oil, and cell regulators, such as paraffins, fatty alcohols and dimethylpolysiloxanes. Particular preference is given to silicone stabilizers.

Dipropylene glycol (DPG) is particularly preferred as additive.

As further component F), the polyol component P) preferably comprises one or more foam stabilizers, especially silicone-containing foam stabilizers such as siloxane-oxyalkylene copolymers and other organopolysiloxanes.

The aforementioned foam stabilizers are preferably employed in amounts of 0.5% to 4.5% by weight, particularly preferably 1% to 3.5% by weight, based on the weight of the polyol component P).

Further details regarding the aforementioned and other suitable auxiliaries and additives can be found in the technical literature, for example in the monograph by J. H. Saunders and K. C. Frisch, "High Polymers", Volume XVI, Polyurethanes, Parts 1 and 2, Interscience Publishers, 1962 and 1964, or in the Kunststoff-Handbuch [Plastics Handbook], Polyurethane [Polyurethanes], Volume VII, Hanser-Verlag, Munich, Vienna, 1st and 2nd Editions, 1966 and 1983.

The polyol component P) can furthermore comprise one or more blowing agents selected from chemical blowing agents G1) and physical blowing agents G2). The polyol component P) preferably comprises at least one blowing agent selected from chemical blowing agents G1) and physical blowing agents G2), and the polyol component P) particularly preferably comprises at least one chemical blowing agent G1) and at least one physical blowing agent G2).

The polyol component P) according to the invention preferably comprises 1% to 20.0% by weight, particularly preferably 1.2% to 5.0% by weight, very particularly preferably 1.5% to 3.0% by weight, of a chemical blowing agent G1), based on the total amount of components A) to G1).

The polyol component P) according to the invention preferably comprises 1% to 40.0% by weight, particularly preferably 3% to 30.0% by weight, very particularly preferably 9.0% to 17.0% by weight, of a physical blowing agent G2), based on the total amount of components A) to G1). Preference is given to hydrocarbons and particular preference is given to acyclic pentane isomers and/or cyclopentane, or mixtures thereof.

According to one embodiment, the polyol component P) according to the invention comprises at least one chemical blowing agent G1) and at least one physical blowing agent G2) in the aforementioned concentration ranges.

Suitable physical blowing agents G2) that can be used are in general all hydrocarbons known to those skilled in the art as blowing agents, for example non-halogenated and halogenated, preferably fluorinated, alkenes.

According to one embodiment, use is made of $C_2$ to $C_6$ fluoroalkenes, particularly preferably $C_3$ to $C_5$ fluoroalkenes.

Particularly preferred examples of fluorinated alkenes that are suitable according to the invention are propenes, butenes, pentenes and hexenes having 3 to 6 fluorine substituents, where other substituents such as chlorine may be present, for example tetrafluoropropenes, fluorochloropropenes, for example trifluoromonochloropropenes, pentafluoropropenes, fluorochlorobutenes, hexafluorobutenes or mixtures thereof.

Fluorinated alkenes that are particularly preferred according to the invention are selected from the group consisting of cis- or trans-1,1,1,3-tetrafluoropropene, 1,1,1-trifluoro-2-chloropropene, 1-chloro-3,3,3-trifluoropropene, 1,1,1,2,3-pentafluoropropene, in cis or trans form, 1,1,1,4,4,4-hexafluorobutene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1,1,3,3-tetrafluoropropene, 2-bromo-3,3,3-trifluoropropene, (E)-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene, 1,1,1-trifluoro-2-butene and mixtures thereof.

According to a further embodiment, no halogenated hydrocarbons are used as physical blowing agents G2).

Preferably used as physical blowing agents G2) are acyclic pentane isomers and/or cyclopentane, especially cyclopentane. Preference is given to using acyclic pentane isomers and/or cyclopentane in the range from 9% to 17% by weight, based on the total amount of components A) to G1). Preference is given to cyclopentane and mixtures of isopentane with cyclopentane having a content of at least 70% by weight of cyclopentane, and particular preference is given to using cyclopentane having a purity of at least 90% by weight, especially of at least 95% by weight.

Water is preferably used as chemical blowing agent G1). Water is especially preferably employed at a concentration of 1.5% to 3% by weight, based on the total amount of components A) to G1).

The polyol component P) preferably consists of:
a) 35% to 70% by weight of one or more polyether polyols A) having an OH number in the range from 300 to 520 mg KOH/g and selected from reaction products of monosaccharides, oligosaccharides, polysaccharides, polyhydric alcohols or mixtures thereof with alkylene oxides;
b) 5% to 45% by weight of one or more polyether polyols B) having an OH number in the range from 320 to 500 mg KOH/g is selected from the reaction products of aromatic diamines with alkylene oxides:
c) >0% to 30% by weight of one or more polyether polyols C) having an OH number in the range from 100 to 240 mg KOH/g and selected from reaction products of amines, polyhydric alcohols or mixtures thereof with alkylene oxides;
d) 5% to 40% by weight of one or more polyether ester polyols D) having an OH number of 380 to 480 mg KOH/g and a content of fatty acids of 5% to 25% by weight, based on the polyether ester polyols D);
e) optionally one or more catalysts E);
f) optionally one or more further components F) selected from auxiliaries and additives;
g) optionally one or more blowing agents selected from chemical blowing agents G1) and physical blowing agents G2);
where the concentration figures in % by weight for A) to D) are based on the total amount of components A) to G1) of the polyol component P).

Particular preference is given to polyol components P) as described above, in which the polyether polyol A) has a functionality of 5.7 to 6.5 and the polyether polyol B) is present in an amount of 18% to 40% by weight. Rigid polyurethane foams having particularly good demoldability and simultaneously good adhesion and thermal insulation can be produced from these polyol components P).

The invention likewise relates to a process for producing rigid polyurethane foams by reacting
I) organic or modified organic di or polyisocyanates PI) or mixtures thereof with
II) a polyol component P) according to the invention.

The polyol component P) employed for the reaction with the organic di- or polyisocyanates PI) preferably comprises at least one blowing agent selected from chemical blowing agents G1) and physical blowing agents G2). The polyol component P) employed for the reaction with the di- or polyisocyanates PI) likewise preferably comprises one or more catalysts E), and the polyol component P) very particularly preferably comprises at least one blowing agent selected from chemical blowing agents G1) and physical blowing agents G2) and at least one catalyst E).

Di- or Polyisocyanates PI)

Possible organic di- or polyisocyanates PI) include the aliphatic, cycloaliphatic, araliphatic and preferably the aromatic polyfunctional isocyanates known per se. The organic di- or polyisocyanates can optionally be modified.

Specific examples include: Alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic di- and polyisocyanates such as, for example, tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 2,4'-, 2,4'- and 2,2'-diisocyanates and polyphenylpolymethylene polyisocyanates (crude MDI) and mixtures of crude MDI and tolylene diisocyanates. The organic di- or polyisocyanates can be used individually or in the form of their mixtures.

Preferred polyisocyanates are tolylene diisocyanate (TDI), diphenylmethane diisocyanate (MDI) and especially mixtures of diphenylmethane diisocyanate and polyphenylenepolymethylene polyisocyanates (polymeric MDI or PMDI).

Use is frequently also made of modified polyfunctional isocyanates, i. e. products which are obtained by chemical reaction of organic polyisocyanates. Examples which may be mentioned are polyisocyanates comprising ester, urea, biuret, allophanate, carbodiimide, isocyanurate, uretidione, carbamate and/or urethane groups.

Very particular preference is given to employing polymeric MDI for the production of the rigid polyurethane foams according to the invention, for example Lupranat® M20 from BASF SE.

To produce the rigid polyurethane foams according to the invention, the optionally modified organic di- and/or polyisocyanates PI) and the polyol component P) according to the invention and comprising a blowing agent are reacted in amounts such that the isocyanate index is 70 to 300, preferably 90 to 200, particularly preferably 100 to 150.

The rigid polyurethane foams are advantageously produced by the one-shot process, for example by means of the high-pressure or low-pressure technique, in open or closed molds, for example metallic molds. It is also customary to apply the reaction mixture continuously to suitable conveyor lines in order to create panels.

The starting components are mixed at a temperature of 10 to 30° C., preferably of 15 to 30° C. and in particular of 15 to 25° C., and introduced into the open mold or, optionally under elevated pressure, into the closed mold. Mixing is customarily effected in a high-pressure mixing head. The mold temperature is advantageously 30 to 70° C., preferably 40 to 60° C.

The invention likewise relates to a rigid polyurethane foam obtainable by the process according to the invention.

The invention likewise relates to the use of the polyol component P) according to the invention for the production of rigid polyurethane foams.

The invention likewise relates to the use of the rigid polyurethane foam produced by the process according to the invention for insulation and refrigeration applications, especially in refrigerators, commercial refrigeration appliances, chest freezers, hot water storage tanks and boilers.

All above-listed embodiments and preferred embodiments are preferably freely combinable with one another, unless the context explicitly goes against this.

The expressions "comprising" and "comprises" preferably also encompass the expressions "consisting", "consisting of" or "consists of".

The invention is illustrated in more detail by the following examples without limiting the invention.

EXAMPLES

I. Measurement Methods:

Measurement of Hydroxyl Number:

Hydroxyl numbers are determined according to DIN 53240 (1971-12).

Viscosity Determination:

The viscosity of the polyols is determined, unless specified otherwise, at 25° C. according to DIN EN ISO 3219 (1994) using a Haake Viscotester 550 with plate/cone measurement geometry (PK100) using the PK 1 1° cone (diameter 28 mm; cone angle: 1°) at a shear rate of 40 1/s.

Determination of Pentane Solubility:

Good pentane solubility of the polyol component over a large temperature range down to a lowest possible temperature (pentane solubility down to 5° C.) is of great importance in the processing industry: good storage stability of the polyol component under different climatic conditions can be ensured as a result. In order to assess pentane solubility (as stability of the polyol component PK with blowing agent), the polyol component P) is mixed with the amount of physical blowing agent G2) specified in the examples (Vollrath agitator, 1500 revolutions/min, 2 min stirring time), placed in a screw-top glass vessel and sealed. After gas bubbles have completely escaped, the clarity of the sample is firstly tested at room temperature. If the sample is clear, it is subsequently cooled in a water bath in 1° C. steps and tested for clarity 30 min after the set temperature has been reached. The temperature given in tables 1 and 2 corresponds to the temperature above which the mixture was still clear.

Determination of Demolding Performance:

Good demolding performance is of the utmost interest in the processing industry, since the processing times in relation to the foam employed are thus reduced. Productivity thus rises and costs can therefore be reduced in this way. Good demolding performance is determined by the post-expansion of the cured rigid PU foam. A lowest possible post-expansion within a shortest possible curing time for the employed components within the mold is desirable, since more rap-id demolding is permitted as a result. Demolding performance is determined by measuring the post-expansion of foam bodies produced with a box mold of dimensions 700×400×90 mm at a mold temperature of 45±2° C. depending on demolding time and degree of overpacking (OP, corresponding to the ratio of the overall bulk density/ minimum fill density and describing the amount, in percent, of additionally added starting materials that would actually be required to exactly fill the mold with a rigid PU foam. The experimental examples described herein were conducted with an OP of 17.5%). Post-expansion is ascertained by means of measuring the height of the foam cuboids after 24 h.

Cream Time:

The time from the commencement of mixing of the reaction mixture to the start of foam expansion.

Setting Time (Gel Time/Fiber Time)

Time from the commencement of mixing of the reaction mixture up to the time until it is possible to draw threads in contact with the foam (for example with a wooden rod). This point thus represents the transition from a liquid to a solid state.

Minimum Fill Density for a Component/Free Rise Density:

The minimum fill density is determined by introducing, into a mold of dimensions 2000×200×50 mm at a mold temperature of 45±2° C., an amount of polyurethane reaction mixture sufficient for the foam to exactly fill the mold without coming into contact with the end of the mold. The length of the flow path is measured and the minimum fill density calculated according to MFD=(m*L/(V*s)), where m=mass, L=length of the mold, s=flow path and V=volume of the mold. The free rise density is determined by foaming the polyurethane reaction mixture into a plastic bag at room temperature. The density is determined on a cube removed from the center of the foamed plastic bag.

Determination of Flowability:

Flowability is given as flow factor=(minimum fill density/free rise density).

Adhesion:

A test specimen is removed from the sample. This corresponds to the first 50 cm of the lance molding, as seen from the sprue, with a degree of overpacking of 14.5%. The aluminum foil is cut into, by means of a stencil, on the top side along a width of 56 mm and a length of 200 mm, and a tab of approximately 50 mm is lifted off from the foam. This is clamped into the sample holder of a universal testing machine. Measurement begins when the testing time is reached. The measured force for peeling off the aluminum foil from the foam is output in newtons. Adhesion values that are intended to be compared with other foam formulations must be measured under the same foaming and testing conditions. In order to test the limit of adhesion of the covering foil to the foam, the mold temperature is lowered in steps of 5° C., the sample is foamed and the adhesion thereto is measured. The adhesion limit is reached when the covering layer detaches from the foam as early as when demolding the sample.

Thermal Conductivity:

Thermal conductivity is determined using a Taurus TCA300 DTX apparatus at an average temperature of 10° C. For production of the test specimen, the polyurethane reaction mixture is introduced into a mold of dimensions 2000×200×50 mm (15% degree of overpacking) and demolded after 5 min. After storage for 24 hours under standard climatic conditions, a plurality of foam cuboids (positions 10, 900 and 1700 mm with respect to the start of the lance) of dimensions 200×200×50 mm are cut out from the center. Subsequently, the top and bottom sides are removed so that test specimens of dimensions 200×200×30 mm are obtained.

Compressive Strength:

Compressive strength is determined according to DIN ISO 844 EN DE (2014-11).

II. Preparation of the Polyols:

Polyether Polyols A and A1):

A pressure reactor equipped with stirrer, jacket heating and cooling, metering devices for solid and liquid substances and alkylene oxides and also devices for nitrogen inertization and a vacuum system was filled with glycerol, sucrose, solid imidazole and for polyol A with a polyether polyol based on sucrose, glycerol and propylene oxide (propoxylation product of a mixture of glycerol and sucrose; molecular weight 488 g/mol, functionality 4.3, is a). Subsequently, inertization (with stirring) was effected multiple times and the temperature was increased to 120° C. The mixture was reacted at 120° C. with propylene oxide. The 2-hour post-reaction took place at 120° C. The sample was then stripped off in a nitrogen stream.

Example of the Calculation of the Functionality on the Basis of Polyether Polyol A)

12.3 kg of glycerol, 90.70 kg of sucrose, 0.34 kg of solid imidazo and 29.00 kg of the polyether polyol based on sucrose, glycerol and propylene oxide (molecular weight 488 g/mol, functionality 4.3) were reacted with 256.3 kg of propylene oxide, and 372 kg of product having the following parameters were obtained:

OH number: 429 mg KOH/g

Viscosity (25° C.): 34 600 mPas

Calculation of Starter Functionality:

Glycerol (functionality 3): 12 300 g/92.09 g/mol=132.4 mol

Sucrose (functionality 8): 90 700 g/342.3 g/mol=246.97 mol

Imidazole (functionality 1): 340 g/68.08 g/mol=5.0 mol

Polyether polyol (functionality 4.3): 29 000 g/488 g/mol=59.4 mol

Starter functionality: (132.4 mol*3+246.97 mol*8+5.0 mol*1+59.4 mol*4.3)/(132.4 mol+246.97 mol+5.0 mol+59.40 mol)=6.0

Composition (Percent by Mass):

| | |
|---|---|
| Sucrose | 23.3% |
| Glycerol | 3.2% |
| Polyether polyol | 7.5% |
| Propylene oxide | 66.0% |

Polyether Polyol B):

A pressure reactor equipped with stirrer, jacket heating and cooling, metering devices for solid and liquid substances and alkylene oxides and also devices for nitrogen inertization and a vacuum system was heated to 80° C. and inertized repeatedly. The reactor was charged with victoluenediamine and the stirrer was put into operation. Subsequently, the reactor was inertized once again and the temperature was increased to 130° C., and propylene oxide was metered in. After a 2 h reaction to completion, the temperature was lowered to 100° C. and dimethylethanolamine was added. The intermediate was reacted with further propylene oxide. Post-reaction ran for 2 hours at 130° C. The sample was then stripped off in a nitrogen stream.

Polyether Polyol C):

A pressure reactor equipped with stirrer, jacket heating and cooling, metering devices for solid and liquid substances and alkylene oxides and also devices for nitrogen inertization and a vacuum system was heated to 80° C. and inertized repeatedly. Vicinal toluenediamine was added and the reactor was inertized repeatedly. The temperature was increased to 130° C. and the mixture was admixed at this temperature with a mixture of ethylene oxide and propylene oxide (EO:PO=1:15). After a 2 h reaction to completion, a 50% aqueous KOH solution (percent by mass) was added. This was followed by a 1 h vacuum phase and then a mixture of ethylene oxide and propylene oxide (EO:PO=1:15) was metered in at 130° C. After a 3 h reaction to completion, the sample was stripped off in a nitrogen stream.

Polyether Polyol C1):

A pressure reactor equipped with stirrer, jacket heating and cooling, metering devices for solid and liquid substances and alkylene oxides and also devices for nitrogen inertization and a vacuum system was heated to 80° C. and inertized repeatedly. Subsequently, trimethylolpropane and a KOH solution (50%, aqueous) were added. The temperature was then increased to 130° C. and a starter drying operation was conducted at 10 mbar for 2 h. Subsequently, propylene oxide was metered in at 130° C. After a 3 h reaction to completion, the sample was stripped off in a nitrogen stream.

Polyester Ether Polyol D) and D1):

A pressure reactor equipped with stirrer, jacket heating and cooling, metering devices for solid and liquid substances and alkylene oxides and also devices for nitrogen inertization and a vacuum system was heated to 80° C. and inertized repeatedly. Glycerol, aqueous imidazole solution (50% percent by weight), sucrose and biodiesel (biodiesel according to standard EN 14214, 2010) were initially charged at 25° C. This was then inertized three times with nitrogen. The tank was heated to 130° C. and propylene oxide was metered in. After a 3 h reaction to completion, the reactor was evacuated for 60 minutes under complete vacuum at 100° C. and then cooled down to 25° C.

III. Feedstocks

Polyols A) to D) were prepared as described above.

Polyol A): Polyether polyol based on sucrose, glycerol and propylene oxide (PO) having an OH number of 429 mg KOH/g; functionality: 6.0

Polyol A1): Polyether polyol based on sucrose, glycerol and PO having an OH number of 450 mg KOH/g; functionality: 5.1

Polyol B): Polyether polyol based on vic-TDA and PO having an OH number of 399 mg KOH/g; functionality: 3.9*

Polyol C): Polyether polyol based on vic-TDA, ethylene oxide (EO) and PO having an OH number of 160 mg KOH/g; functionality: 3.9*

* The functionality for polyols B and C is <4.0 due to the presence of small amounts of water that were added via addition of the catalyst (aqueous KOH solution) to the starter TDA.

Polyol C1): Polyether polyol based on trimethylolpropane, PO having an OH number of 160 mg KOH/g; functionality: 2.9**

** The functionality for polyol C1 is <3.0 due to the presence of small amounts of water that were added via addition of the catalyst (aqueous KOH solution) to the starter trimethylolpropane.

Polyol D): Polyether ester polyol based on sucrose, glycerol, PO and biodiesel (14% by weight), OH number 420 mg KOH/g; functionality: 4.5

Polyol D1): Polyether ester polyol based on sucrose, glycerol, PO and biodiesel (37% by weight), OH number 280 mg KOH/g Catalyst Mixture E) Consisting of:

Catalyst E1): Dimethylcyclohexylamine

Catalyst E2): Pentamethyldiethylenetriamine or bis(2-dimethylaminoethyl) ether

Catalyst E3): Tris(dimethylaminopropyl)hexahydro-1,3,5-triazine

Catalyst E4): Dimethylbenzylamine

Stabilizer F):

Silicone-containing foam stabilizer, Tegostab® B8474 and/or Tegostab® B8491 or Tegostab® 84204 or Tegostab 84214® from Evonik Cyclopentane 70 (CP 70): Cyclopentane/isopentane mixture at the ratio 70:30

Cyclopentane 95 (CP 95): Cyclopentane having 95% purity

Mixture E-F-G-1 of Catalyst Mixture E), Further Components F) and Chemical Blowing Agents G1) Composed Of:

1.5% by weight of catalyst mixture E),
2.0% by weight of propylene carbonate,
3.0% by weight of foam stabilizer, and
2.5% by weight of $H_2O$, where the % by weight are based on the total weight of the polyol components A) to D) plus E-F-G-1.

Mixture E-F-G-2 of Catalyst Mixture E), Further Components F) and Chemical Blowing Agents G1) Composed Of:

2.5% by weight of catalyst mixture E).
2.0% by weight of propylene carbonate,
3.0% by weight of foam stabilizer, and
2.5% by weight of $H_2O$, where the % by weight are based on the total weight of the polyol components A) to D) plus E-F-G-2.

Furthermore, 13.5% by weight of cyclopentane 70 or 95 was additionally added to each polyol component, based on the total weight of the polyol components A) to D) plus E-F-G-1 or E-F-G-2. In the case of the cyclopentane 95 version, 14.5 parts of the blowing agent (cyclopentane 95) were added as a variant to the formulations based on E-F-G-1 for the purpose of adjusting the density.

Isocyanate:

Polymeric MDI having an NCO content of 31.5% by weight (Lupranat® M20)

IV. Rigid PU Foams

Polyol components P) were prepared from the aforementioned feedstocks, to which components a physical blowing agent was added prior to foaming. By means of a high-pressure Puromat® PU 30/80 IQ (Elastogran GmbH) having a discharge rate of 250 g/s, the polyol components P) admixed with the physical blowing agent were each mixed with the required amount of the specified isocyanate, so that the desired isocyanate index was achieved.

The reaction mixture was injected into molds adjusted to a temperature of 40° C. and having dimensions of 2000 mm×200 mm×50 mm or 400 mm×700 mm×90 mm, and allowed to foam up therein. The degree of overpacking was 17.5%, that is 17.5% more reaction mixture was used than would have been necessary to completely foam-fill the mold.

The cream time, setting time and free rise density were ascertained by means of high-pressure mixing by machine (by means of a high-pressure Puromat® PU 30/80 IQ) and introduction into a PE bag. In this case, are Material are inserted into the PE bag (diameter*30 cm). The cream time is defined as the period of time between the start of insertion and the start of volume expansion of the reaction mixture. The setting time is the period of time between the start of insertion and the point in time from which threads can be pulled from the reaction mixture, for example by means of a foam strip. If no processing by machine is possible (e.g. on account of inhomogeneities in the polyol component), the cream time, setting time and free foam density were determined by means of a beaker test by means of manual foaming. The components in this case are adjusted to a temperature of 20±0.5° C. The polyol component was initially charged in the corresponding paper cup, the isocyanate component was weighed in and the reaction mixture was stirred. The stopwatch is started at the beginning of stirring. The cream time is defined here as the period of time between the beginning of stirring and the start of volume expansion of the reaction mixture by means of foam formation. The setting time (fiber time) corresponds to the time from the beginning of mixing up to the time in the reaction process at which threads can be pulled out from the foam composition using a glass bar. In order to ascertain the free rise density in a cup test, the foam head is cut off after the foam has cured. The cut is made perpendicularly to the rise direction on the edge of the testing cup, with the result that the foam cutting face and the upper edge of the testing cup lie in one plane. The content of the cup is weighed and the free rise density is calculated.

Tables 1 and 2 show the polyol components P) used and the measurement results for the rigid PU foams produced therefrom (degree of overpacking OP of the molded foams: 17.5%). Examples E1 to E10 are inventive examples, examples C1 to C6 are comparative examples.

It is apparent from the results summarized in tables 1 and 2 that rigid PU foams produced using polyol components P) according to the invention exhibit an improved combination of advantageous properties with respect to demoldability (recognizable in the tables by the lower values for post-expansion), good adhesion and thermal insulation, wherein the polyol component P) is also readily compatible with the nonpolar pentanes employed as blowing agents and permits the provision of machine-processable, pentane-containing polyol components.

TABLE 1

| Component // property | E1 | E2 | C1 | C2 | E3 | E4 | C3 | E5 | E6 | C4 | C5 |
|---|---|---|---|---|---|---|---|---|---|---|---|
| Polyol A [% by weight] | 42 | 42 | 67 | 42 | 47 | 37 | 22 | | 56 | 56 | |
| Polyol A1 [% by weight] | | | | | | | | 42 | | | 56 |
| Polyol B [% by weight] | 12 | 12 | 12 | 12 | 12 | 12 | 12 | 12 | 12 | 12 | 12 |
| Polyol C [% by weight] | 12 | 12 | 12 | 12 | 12 | 12 | 12 | 12 | 12 | 23 | 23 |
| Polyol D [% by weight] | 25 | 25 | | | 20 | 30 | 45 | 25 | 11 | | |
| Polyol D1 [% by weight] | | | | 25 | | | | | | | |
| Component E-F-G-1 [% by weight] | 9 | 9 | 9 | 9 | 9 | 9 | 9 | 9 | 9 | 9 | 9 |
| Total [% by weight] | 100 | 100 | 100 | 100 | 100 | 100 | 100 | 100 | 100 | 100 | 100 |
| Cyclopentane | CP 70 | CP 95 | CP 70 | CP 70 | CP 70 | CP 70 | CP 70 | CP 70 | CP 70 | CP 70 | CP 70 |
| NCO index | 124 | 125 | 124 | 124 | 124 | 124 | 124 | 124 | 124 | 125 | 124 |
| Cream time [s] | 5 | 6 | 13[a] | 6 | 5 | 5 | 6 | 6 | 6 | 6 | 6 |
| Setting time [s] | 62 | 64 | 84[a] | 62 | 62 | 63 | 63 | 61 | 63 | 65 | 64 |
| Free rise density [g/l] | 22.3 | 21.9 | 27.8[a] | 22.1 | 23.2 | 22.9 | 22.9 | 22.4 | 23 | 23.3 | 23.2 |
| Minimum fill density [g/l] | 29.2 | 29.7 | — | 28.7 | 30.5 | 30 | 29.7 | 29.4 | 30.2 | 30.5 | 30.4 |
| Phase stability with cyclopentane [° C.] | <4 | <5 | unstable[b] | <4 | <5 | <4 | <4 | <4 | cloudy[c] | <5 | <5 |
| Post-expansion after 3 min [mm] | — | — | — | — | — | — | — | — | — | — | — |
| Post-expansion after 4 min [mm] | 3.0 | 3.4 | — | 3.9 | 3.2 | 3.4 | 3.8 | 3.6 | 3.2 | — | — |
| Post-expansion after 5 min [mm] | 1.7 | 2.0 | — | 2.4 | 2 | 2.2 | 2.4 | 2.3 | 2.2 | 2.8 | 2.9 |
| Post-expansion after 7 min [mm] | 0.4 | 0.6 | — | 1.0 | 0.7 | 0.7 | 1.0 | 0.9 | 0.8 | 1.4 | 1.3 |
| Compressive strength [N/mm$^2$] at 34 g/l | 0.155 | 0.146 | — | 0.139 | 0.159 | 0.153 | 0.153 | 0.158 | 0.156 | 0.147 | 0.152 |
| Adhesion at 35° C. mold temperature [N] | 2.2 | 1.7 | — | 3.7 | 2.6 | 1.4 | 2.6 | 2.8 | 2.5 | 3.6 | 2.8 |
| Thermal conductivity [mW/mK] | 21.1 | 20.4 | — | 21.3 | 21.1 | 21.2 | 21.0 | 21.1 | 21.0 | 21.3 | 21.3 |

[a]manual foaming in a cup, as processing by machine was not possible;
[b]processing by machine not possible;
[c]phase-stable at 20° C. processing by machine was possible despite clouding.

TABLE 2

| Component // property | E7 | E8 | E9 | E10 | C6 | C7 | C8 |
|---|---|---|---|---|---|---|---|
| Polyol A [% by weight] | 45 | 37 | 45 | 45 | 45 | 30 | 45 |
| Polyol A1 [% by weight] | | | | | | | |
| Polyol B [% by weight] | 30 | 30 | 30 | 30 | 30 | 30 | 30 |
| Polyol C [% by weight] | 5 | 3 | 2 | | | | 15 |
| Polyol C1 [% by weight] | | | | 2 | | | |
| Polyol D [% by weight] | 10 | 20 | 13 | 13 | 15 | 30 | |
| Component E-F-G-2 [% by weight] | 10 | 10 | 10 | 10 | 10 | 10 | 10 |
| Total [% by weight] | 100 | 100 | 100 | 100 | 100 | 100 | 100 |
| Cyclopentane | CP 95 | CP 95 | CP 95 | CP 95 | CP 95 | CP 95 | CP 95 |
| NCO index | 121 | 117 | 121 | 121 | 121 | 117 | 121 |
| Viscosity [mPas] | 5500 | 4800 | 6000 | 5500 | 6200 | 4400 | 7200 |
| Cream time [s] | 5 | 4 | 4 | 4 | 4 | 4 | 4 |
| Setting time [s] | 42 | 40 | 40 | 41 | 41 | 40 | 41 |
| Free rise density [g/l] | 22.6 | 22.8 | 23.1 | 23.3 | 23.2 | 22.0 | 22.6 |
| Minimum fill density [g/l] | 30.5 | 30.9 | 30.7 | 31.1 | 30.7 | 29.9 | 30.7 |
| Phase stability with cyclopentane [° C.] | <5 | <5 | <5 | <5 | <5 | <5 | <5 |
| Post-expansion after 3 min [mm] | 3.3 | 3.0 | 3.0 | 3.5 | 3.2 | 3.0 | 3.9 |
| Post-expansion after 4 min [mm] | 1.7 | 1.5 | 1.5 | 1.8 | 1.6 | 1.5 | 2.6 |
| Post-expansion after 5 min [mm] | 0.9 | 0.7 | 0.7 | 1.1 | 0.9 | 0.7 | 1.8 |
| Post-expansion after 7 min [mm] | — | — | — | — | — | — | — |
| Compressive strength [N/mm$^2$] at 34 g/l | 0.163 | 0.157 | 0.158 | 0.157 | 0.165 | 0.171 | 0.179 |
| Adhesion at 35° C. mold temperature [N] | 3.4 | 2.4 | 2.7 | 3.3 | 1.9 | 1.4 | 4.7 |
| Thermal conductivity [mW/mK] | 19.6 | 19.9 | 19.8 | 19.9 | 19.9 | 19.8 | 20.1 |

The invention claimed is:

1. A polyol component P), comprising:
   a) 35% to 70% by weight of one or more polyether polyols A), having an OH number in the range from 300 to 520 mg KOH/g and selected from the group consisting of reaction products of monosaccharides, oligosaccharides, polysaccharides, polyhydric alcohols, alkoxylation products of the aforementioned compounds, and mixtures thereof with alkylene oxides;
   b) 5% to 45% by weight of one or more polyether polyols B), having an OH number in the range from 320 to 500 mg KOH/g and selected from the group consisting of reaction products of aromatic diamines with alkylene oxides;
   c) >0% to 30% by weight of one or more polyether polyols C), having an OH number in the range from 100 to 240 mg KOH/g and selected from the group consisting of reaction products of amines, polyhydric alcohols, and mixtures thereof with alkylene oxides;
   d) 5% to 40% by weight of one or more polyether ester polyols D), having an OH number of 380 to 480 mg KOH/g and a content of fatty acids in the one or more formed polyether ester polyols D), of 5% to 25% by weight, based on the one or more polyether ester polyols D);
   e) optionally, one or more catalysts E);
   f) optionally, one or more further components F) selected from the group consisting of auxiliaries and additives; and
   g) optionally, one or more blowing agents selected from the group consisting of chemical blowing agents G1) and physical blowing agents G2);

wherein the concentration figures in % by weight for A) to D) are based on the total weight of components A) to G1) of the polyol component P).

2. The polyol component P) according to claim 1, wherein the one or more polyether polyol A) has a functionality in the range from 4.6 to 6.5.

3. The polyol component P) according to claim 1, wherein the one or more polyether polyol B) has a functionality in the range from 3.0 to 4.0.

4. The polyol component P) according to claim 1, wherein the one or more polyether polyol B) is selected from the group consisting of reaction products of tolylene-2,3-, -3,4-, -2,4-, -2,5-, or -2,6-diamine and mixtures thereof with $C_2$-$C_4$ alkylene oxides.

5. The polyol component P) according to claim 1, wherein the one or more polyether polyol C) has a functionality in the range from 2.8 to 5.0.

6. The polyol component P) according to claim 1, wherein the one or more polyether polyol C) comprises ethylene oxide and propylene oxide units.

7. The polyol component P) according to claim 1, wherein the one or more polyether polyol C) comprises reaction products of amines selected from the group consisting of ethylenediamine; propylene-1,3-diamine; butylene-1,3- or -1,4-diamine; hexamethylene-1,2-, -1,3-, -1,4-, -1,5-, or -1,6-diamine; phenylenediamine; tolylene-2,3-, -3,4-, -2,4-, -2,5-, or -2,6-diamine; 4,4'-, 2,4'-, or 2,2'-diaminodiphenylmethane; and mixtures thereof with alkylene oxides.

8. The polyol component P) according to claim 1, wherein the one or more polyether polyol C) comprises reaction products of polyhydric alcohols selected from the group consisting of glycerol, trimethylolpropane, monopropylene glycol, diethylene glycol, triethylene glycol, dipropylene glycol, and mixtures thereof with alkylene oxides.

9. The polyol component P) according to claim 1, wherein the one or more polyether ester polyol D) has a functionality of 3.0 to 5.0.

10. The polyol component P) according to claim 1, wherein the one or more polyether polyol A) has a functionality of 5.7 to 6.5 and the one or more polyether polyol B) is present in an amount of 18% to 40% by weight.

11. A process for producing rigid polyurethane foams, the process comprising: reacting
    di- or polyisocyanates PI) or mixtures thereof with
    a polyol component P) according to claim 1.

12. A rigid polyurethane foam obtainable by the process according to claim 11.

13. A method, comprising:
    forming the rigid polyurethane foam produced by the process of claim 11 for insulation and refrigeration applications.

14. The polyol component P) according to claim 8, wherein the dipropylene glycol comprises 2,2'-oxydi-1-propanol, 1,1'-oxydi-2-propanol, and 2-(2-hydroxypropoxy)-1-propanol.

15. A rigid polyurethane foam obtained by the process according to claim 11.

16. Insulation comprising the rigid polyurethane foam of claim 15.

17. A refrigeration appliance comprising the rigid polyurethane foam of claim 15.

18. The polyol according to claim 1, comprising 1 to 25% by weight of polyether polyol (C).

19. The polyol according to claim 1, comprising 2 to 20% by weight of polyether polyol (C).

* * * * *